Jan. 10, 1950    R. MARTINES    2,494,137
METHOD OF ATTACHING WIRE TERMINALS
Filed Aug. 21, 1945
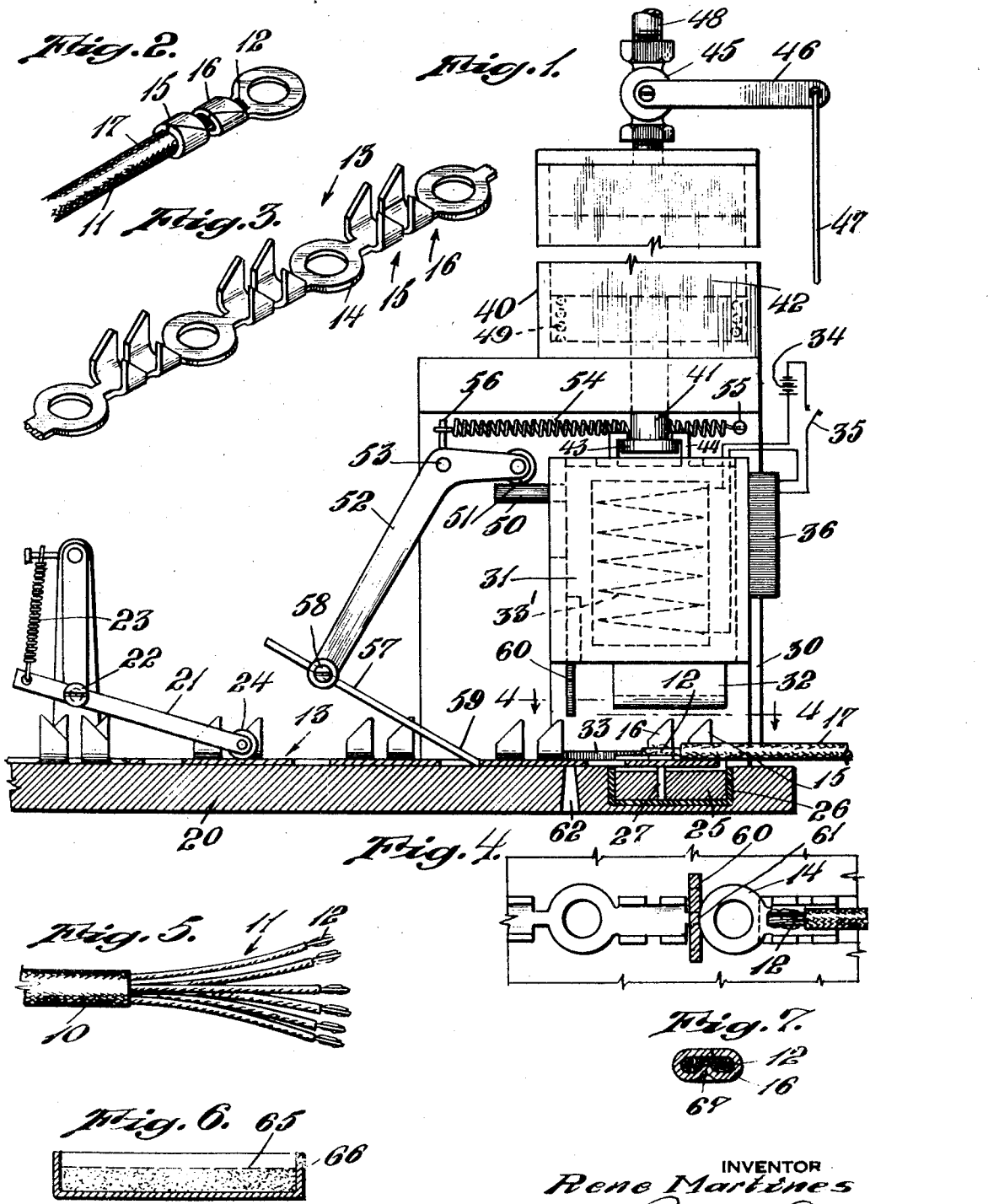
INVENTOR
Rene Martines
BY Barlow & Barlow
ATTORNEYS Patented Jan. 10, 1950

2,494,137

UNITED STATES PATENT OFFICE 2,494,137

METHOD OF ATTACHING WIRE TERMINALS

Rene Martines, Cranston, R. I., assignor, by mesne assignments, to Electric Terminal Corporation, Providence, R. I., a corporation of Rhode Island Application August 21, 1945, Serial No. 611,846

10 Claims. (Cl. 29—155.55)

This invention relates to a wire terminal, more particularly to a method of attaching a terminal to the end of a wire.

Terminals are usually formed of sheet stock, each as a separate unit, and such unit is individually handled by the assembler in such a way as to either solder the terminal to the wire or to so deflect the stock of the terminal that is is mechanically attached to the wire. In some cases, soldering takes place after mechanical attachment by a separate operation. This method of assembling terminals on the ends of wire is expensive.

One of the objects of this invention is to provide a method of procedure whereby there will be less handling of the terminal in attaching the terminal to the end of the wire.

Another object of this invention is to provide a better and stronger attachment of the terminal to the wire.

Another object of this invention is to simultaneously perform several operations which have heretofore been performed separately.

Another object of this invention is to so provide a plurality of terminals and in such a form that they may be mechanically fed into a position for attachment.

Another object of this invention is to provide an apparatus for handling of the terminals so that the person who operates the apparatus for soldering the terminal onto the wire need not touch the terminal.

With these and other objects in view, the invention consists of certain novel features of construction, as will be more fully described and particularly pointed out in the appended claims.

In the accompanying drawings:

Fig. 1 is a sectional view through a portion of a machine for handling terminals to attach the same to a wire in accordance with this invention.

Fig. 2 is a perspective view of an end portion of insulated wire with a terminal attached thereto.

Fig. 3 is a perspective view of a strip of terminals.

Fig. 4 is a sectional view at substantially line 4—4 of Fig. 1.

Fig. 5 is a plan view illustrating a cable with a plurality of separate wires prepared for having terminals attached thereto.

Fig. 6 is a sectional view illustrating a container for solder.

Fig. 7 is a sectional view through the terminal.

In proceeding with this invention, the wires to which the terminals are to be attached are prepared by stripping the same from insulation in the usual manner. The wires are then dipped in powdered solder which is mixed up in such a form that the solder will adhere to the ends of the wires. The terminals which are to be attached are formed in a strip in tandem relation so that this strip may afford a means of controlling and mechanically handling each of the terminals. The terminals are presented in correct position over a die, and the wires which have been treated with solder are placed in the terminal and then, upon operation of some control, a plunger descends to roll the terminal about the wire and, at the same time, to solder the two together. Rolling the stock about the wire serves to displace a certain amount of the solder and thus provides a better and firmer joint and at the same time causes a mechanical grip of the terminal on the wire even though solder is not present. As this operation is performed, a severing operation takes place so as to cause the end terminal to be detached from the strip as it is attached to the end of the wire.

With reference to the drawings, 10 designates a group of wires in assembled relation by reason of a braided covering, the individual wires being designated 11 and being stripped of their insulation at their ends 12. The terminals which are to be provided on the ends of these wires are prepared in the form of a strip, as shown generally in Fig. 3 at 13. Each terminal consists of a ring-like portion 14 and two pairs of ears, designated generally 15 and 16. These pairs of arms or ears 15 and 16 are rolled about the wire and its insulation as shown in Fig. 2 in the finished form, the arrangement being such that the ears 16 are rolled directly in contact with the bared portion 12 of the wire, while the ears 15 are rolled into contact with the insulation 17 of the wire 11.

By having the terminals in strip form as shown at 13, these terminals may be fed along a table 20, as shown in Fig. 1, being controlled by an arm 21, pivoted as at 22, and urged by spring 23 so that the roller 24 on its end will press firmly into engagement with the strip of terminals 13. The terminals are advanced in position over a die 25 which is set into the table 20 of the apparatus. Some insulation for heat, such as a lining of magnesia 26 is provided about this die 25. A steel pin 27 is set into the die and sticks upwardly beyond its surface slightly so as to provide an indentation in the terminal as it is forced downwardly to be rolled about the wire.

Above the table, a framework 30 provides a guide for a reciprocating plunger 31 which carries a closing dies 32 to mate with the die 25. This entire superstructure is insulated as at 33 to prevent conductivity of heat from the table. Heating of this closing die 32 is had by resistance wires 33' which are heated by some suitable source of electric power 34 upon the closure of some control switch 35. This energy in the wires is further controlled by a thermostatic switch 36, set to maintain the plunger 31 at a pre-determined temperature, which will conduct sufficient heat to the work to melt the solder which is placed on the bare ends of the wire.

Any suitable means for reciprocating the plunger 31 may be provided. I have here shown a cylinder 40 above the plunger which has a rod 41 extending from a piston 42 which is provided with a flange 43 which is engaged by fingers 44 extending upwardly from the plunger and over the flange so as to provide a minimum surface contact between the plunger 31 and the rod 41, thus preventing excessive loss of heat by conductivity. A control valve 45 is actuated through lever 46, which is moved by link 47, either by foot or hand, so that when compressed air, which is supplied as at 48, is permitted to enter the cylinder 40, the piston will be driven downwardly, and consequently the plunger will be driven downwardly. Upon release of the valve, the plunger will be lifted through any suitable means, such as spring 49, ready for another stroke.

The plunger 31 carries an arm 50 which is engaged by the roller 51 of a lever 52, pivoted as at 53 and urged about its pivot by spring 54, engaging at 55 a fixed part of the apparatus and engaging a pin 56 which is attached to the lever 52 adjacent its pivotal mounting. At the other end of the lever 52 a feeding dog 57 is pivoted as at 58, which will have its end, 59, extending into engagement with the work. As the plunger descends, the spring will cause the lever 52 to rock counterclockwise and cause the feeding dog 57 to move rearwardly to engage a new bite on the strip of stock 13 which is to be fed. As the plunger again is raised, the movement will cause the dog 57 to force the strip of stock to the right as in Fig. 1 until the end of the stock engages a stop, which will correctly position it over the die 25.

As the plunger descends, the rolling die 32 will roll the arms 15 about the insulation and the arms 16 about the bared portion 12 of the wire which is to be attached to the terminal. At the same time, the severing tool 60, which is attached to the plunger 31, and which is arcuate in shape as at 61 (see Fig. 4) so as to conform to the curvature of the portion 14 of the terminal, will sever a short piece from the stock by cutting it off bluntly against the edges of the opening 62 in the table, and discharge the portion of the stock so cut through the opening 62. This gives a good blunt cut to the ends and does not provide a chisel-shaped edge. The ends of the wires 11 are dipped in the powdered solder 65 (shown in Fig. 6 as contained in tray 66) which by reason of its mixing will adhere to the ends of the wire. An end 12 is then placed in the terminal located in the die 25 and as the closing die descends, it will, by pressure on the ears and by reason of the heat which is imparted thereto, cause sufficient heat to be imparted to the solder so that this solder will melt and be displaced by the rolling of the ears 16 about the bared portion 12 of the stock. This displacement of the solder serves to break up any capillary attraction or surface tension, and also provides that the ear 16 to be rolled into firm mechanical engagement with the wire, and not be merely attached by solder placed between the ears and the wire. At the same time that the rolling die descends, the pin 27 will be forced into the stock of the terminal so as to provide a projection 67 therein, as shown in Fig. 7 to assist further in the mechanical attachment and provision of a tight grip between the wire 12 and the wings 16 which are rolled about it.

The temperature which will be provided will be from 400 to 600 degrees Fahrenheit, thus a temperature which will not burn the insulation of the wire when attachment is performed.

From the above, it will be apparent that I perform several operations simultaneously. The strip of stock is mechanically fed into position so that it does not have to be touched by the operator. The operator then merely lays the end of the wire which is to be attached and which has been previously coated with solder, into the terminal. Through some control actuated by the operator, the plunger is caused to descend to simultaneously shear the terminal from the strip to which it has been attached, heat the solder so that it melts, and roll in the ears or wings of the terminal in such a manner that they displace the melted solder and are rolled into firm contact with the end of the wire. At the same time, the opposite side of the stock of the terminal is deflected so that a firm mechanical binding of the ears on the wire is performed, and the terminal is securely attached. As a soldering operation occurs at the same time a better, stronger joint between the wire and the terminal is provided.

I claim:

1. The method of attaching to a metallic wire having a bare end and an insulating covering adjacent said end and a metallic terminal having a body with arms extending from the body which comprises positioning the bare end and insulation within said arms, providing soft solder at the location of said bare end and bending said arms about said bare end and said insulation and simultaneously with the bending of said arms about said bare end applying heat as a function of degree and time to the bare end and arms bent thereabout to cause soldering and yet insufficient to cause scorching of the insulation.

2. The method of claim 1 wherein said soft solder melts at between 400° and 600° F.

3. The method of claim 1 wherein said arms that are bent about the bare end are separate from the arms that are bent about said insulation.

4. The method of claim 1 wherein at the time of bending said arms said body is bent inwardly toward said embracing arms to compress and bind the wire in the terminal.

5. The method of attaching a metallic wire having a bare end and an insulating covering adjacent said end and the end terminal of a strip of terminals having a body with arms extending at an angle to the body which comprises positioning the bare end and insulation within said arms, providing soft solder at the location of said bare end and bending said arms about said bare end and said insulation and simultaneously with the bending of said arms about said bare end applying heat as a function of degree and time to the bare end and arms bent thereabout to cause soldering and yet insufficient to cause scorching of the insulation, and at the same time severing the end terminal from said strip.

6. The method of claim 5 wherein after severing one terminal, the next terminal of the strip is then positioned into the position of the attached terminal.

7. The method of attaching to a metallic wire having a bare end and an insulating covering adjacent said end and a metallic terminal having a body with integral means extending laterally from the body which comprises positioning the bare end and insulation within said means, providing soft solder at the location of said bare end and bending said means about said bare end and said insulation and simultaneously with the bending of said means about said bare end applying heat as a function of degree and time to the bare end and means bent thereabout to cause soldering and yet insufficient to cause scorching of the insulation.

8. The method of claim 7 wherein said soft solder melts at between 400° and 600° F.

9. The method of claim 7 wherein said means that are bent about the bare end are separated from the means that are bent about said insulation.

10. The method of claim 7 wherein at the time of bending said means said body is bent inwardly toward said embracing means to compress and bind the wire in the terminal.

RENE MARTINES.

REFERENCES CITED

The following references are of record in the file of this patent:

UNITED STATES PATENTS

| Number | Name | Date |
| --- | --- | --- |
| 976,947 | Sturdevant | Nov. 29, 1910 |
| 1,677,133 | Ford | July 17, 1928 |
| 1,708,193 | Sherwood | Apr. 9, 1929 |
| 1,873,125 | Holmes et al. | Aug. 23, 1932 |
| 1,959,150 | Basch et al. | May 15, 1934 |
| 1,976,929 | Elliott | Oct. 16, 1934 |
| 2,275,163 | Thomas | Mar. 3, 1942 |
| 2,288,918 | Parker | July 7, 1942 |